Jan. 30, 1968  YVES-JEAN F. BRETTE  3,366,798
ELECTRO-MAGNETIC LOGICAL DEVICE
Filed Jan. 13, 1964  9 Sheets-Sheet 1

United States Patent Office 3,366,798
Patented Jan. 30, 1968

3,366,798
ELECTRO-MAGNETIC LOGICAL DEVICE
Yves-Jean François Brette, Sevres, France, assignor to Compagnie des Machines Bull (Societe Anonyme), Paris, France
Filed Jan. 13, 1964, Ser. No. 337,398
1 Claim. (Cl. 307—88)

ABSTRACT OF THE DISCLOSURE

The invention provides devices capable of supplying at their output signals representing logical sums of logical products of binary values appropriately represented by signals applied to their input. The arrangement is such that an output winding is inductively coupled to an exciting winding when particular combinations of input signals are applied to input windings, the input signals bringing to the state of magnetic saturation certain paths of a magnetic circuit made of a soft magnetic material.

---

The present invention concerns static electromagnetic logical devices.

The invention also relates to information-processing systems utilising such devices and more particularly to those systems of this type which process information represented by pulses.

In a large number of logical devices at present known, use has been made of the characteristics of residual magnetic induction of certain ferromagnetic substances. However, magnetic materials having the high remanence characteristic required for correct operation of these devices are relatively costly and their use involves disadvantages.

The logical devices according to the invention avoid the aforesaid disadvantages. These devices do not involve the phenomena of residual induction and they utilise soft ferromagnetic materials, i.e. ferromagnetic materials having low residual magnetic induction and preferably a rectilinear magnetisation curve as far as saturation.

The present invention concerns logical devices utilising soft ferromagnetic materials, which are capable of supplying at their output signals representing logical sums and logical products of complementary values of binary variables appropriately represented by signals applied to their inputs.

The invention also concerns logical devices utilising soft ferromagnetic materials, which are capable of supplying at their output signals representing any logical function of the form $$S = \Sigma_{i=1}^{n} A_i^1 A_i^1 \ldots A_i^p$$

the letters $n$ and $p$ representing integers and the symbols such as $A_i^1, A_i^2 \ldots A_i^p$ binary variables appropriately represented by signals applied to their inputs.

Figure 1:
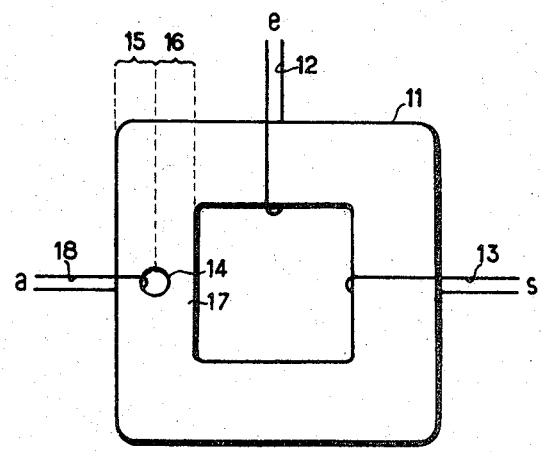
Figure 2:
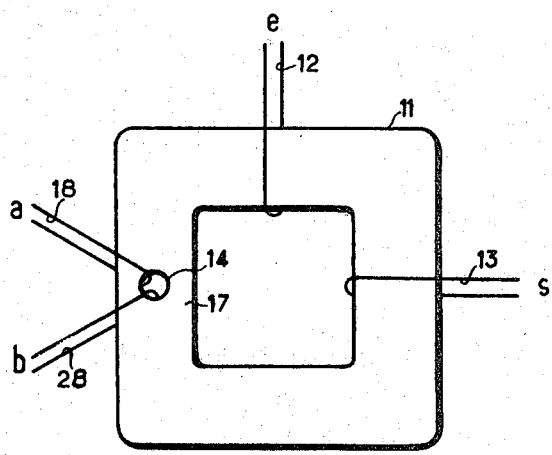
Figure 3:
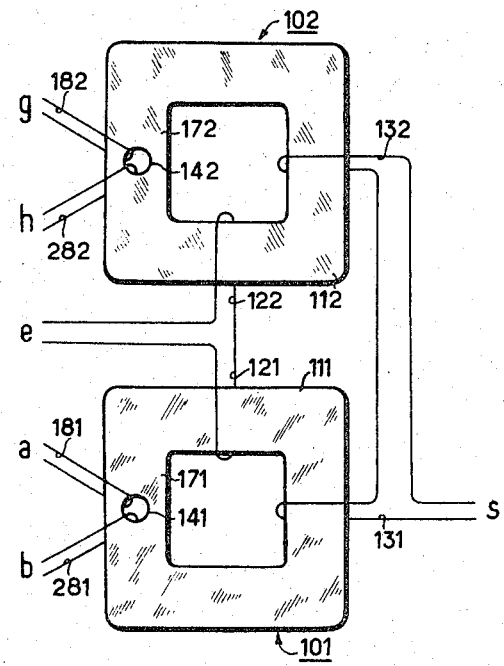
Figure 4:
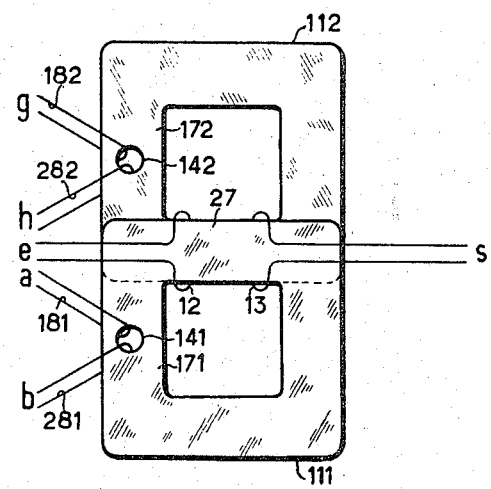
Figure 5:
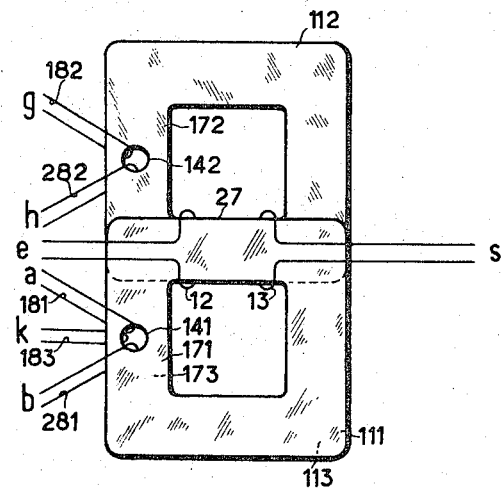
Figure 6:
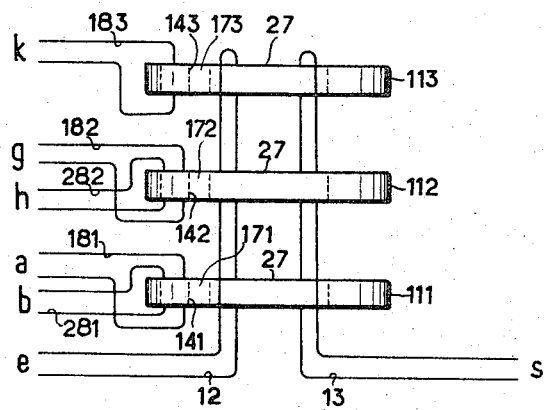
Figure 7:
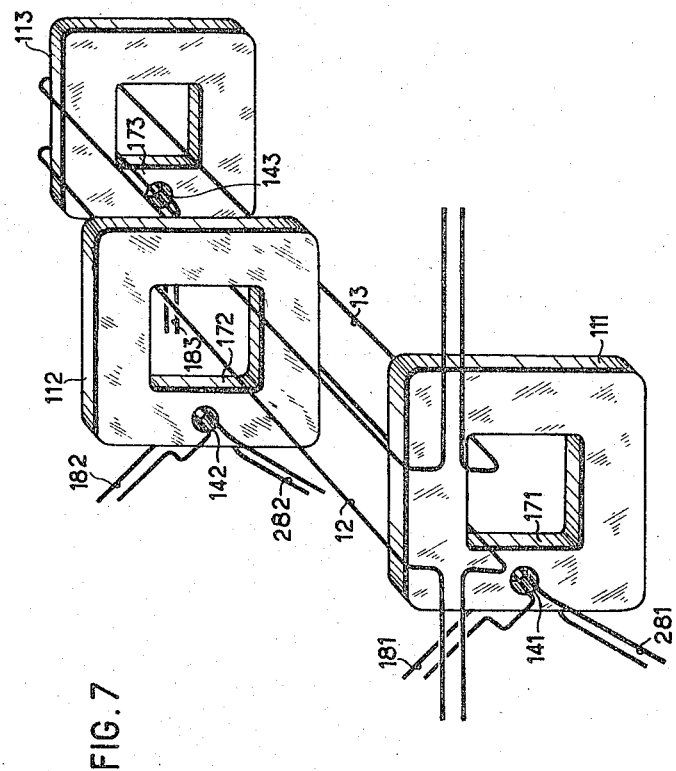
Figure 11:
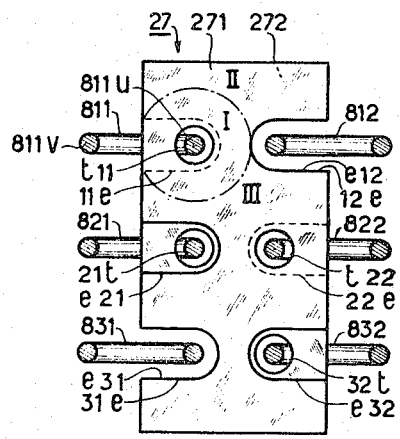
Figure 12:
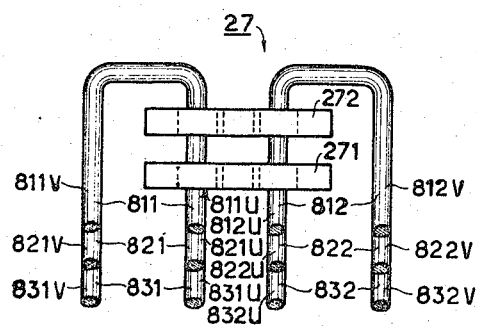
Figure 13:
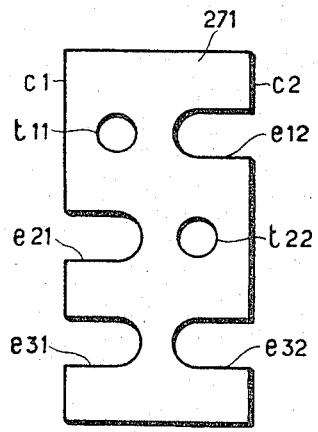
Figure 14:
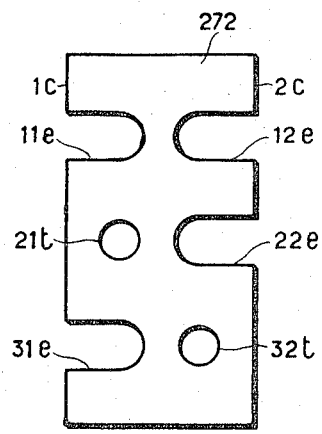
Figure 15:
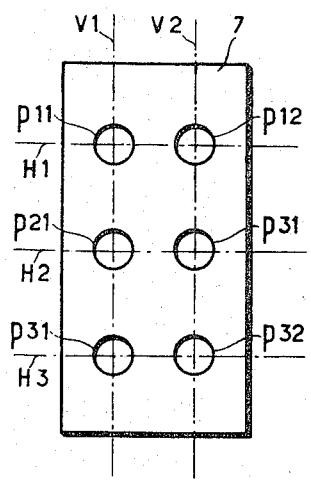
Figure 17:
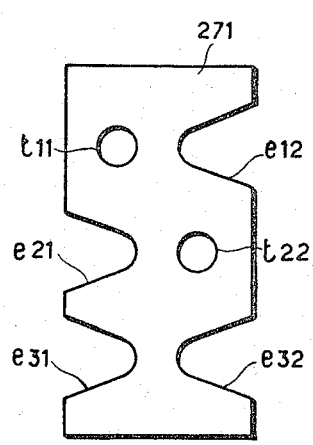
Figure 16:
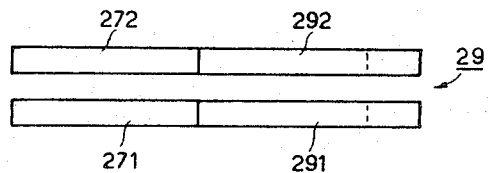
Figure 18:
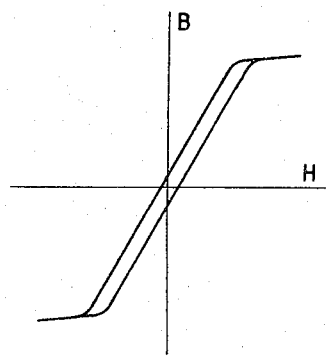

For a better understanding of the invention and to show how it may be carried into effect the same will now be described, by way of example, with reference to the accompanying drawings, in which:

FIGURES 1 and 2 illustrate logical devices belonging to a first type of logical device according to the invention, FIGURE 3 illustrates a circuit arrangement according to the invention, comprising a number of devices of the first type, FIGURES 4 and 5 illustrate logical devices belonging to a second type of logical device according to the invention, FIGURES 6 and 7 are a view from above and an exploded perspective view of the device illustrated by FIGURE 5, FIGURES 8 to 10 are side view, a view from above and an exploded perspective view of a logical device belonging to a third type of logical device according to the invention, FIGURES 11 to 14 illustrate parts of the device illustrated in FIGURES 8 to 10, FIGURE 15 illustrates a member from which the parts illustrated in FIGURES 13 and 14 can be produced, FIGURE 16 is view from above of an assembly of magnetic elements according to a modified construction of the device illustrated in FIGURES 8 to 10, FIGURE 17 illustrates a modified form of the member illustrated in FIGURE 13, and FIGURE 18 shows the hysteresis curve of a ferromagnetic material which can be employed in the logical devices according to the invention.

FIGURE 1 illustrates an electromagnetic logical device according to the invention. Such a device comprises essentially a closed magnetic circuit 11 made of a soft magnetic material, i.e., a material having a low residual magnetic induction. Use will preferably be made of a soft magnetic material having a hysteresis curve of the form indicated in FIGURE 18. The device comprises in addition two electric windings 12 and 13 wound on the magnetic circuit in such manner as to be inductively coupled by the latter, these windings being wound on a portion of the magnetic circuit which is hereinafter called the trunk portion. These windings are hereinafter called the exciting winding and the output winding respectively.

An aperture 14 divides into two branches 15 and 16 a portion 17 of the magnetic circuit, which portion is hereinafter called the control branch, or the branch portion. An electric conductor 18 called the input winding extends through the aperture 14.

In the absence of current in the input winding 18 the device behaves as a transformer. More especially, when a pulse, hereinafter called an exciting pulse, is applied to the exciting winding 12 a pulse hereinafter called the output pulse $s$ is supplied by the output winding 13.

However, if a current, called the saturation current, is passed through the input winding 18 of the said current is of sufficient value to bring the magnetic material of the branches 15 and 16 to the state of magnetic saturation, the inductive coupling between the exciting winding 12 and the output winding 13 decreases considerably, so that no appreciable output pulse is supplied in this case by the output winding 13 in response to the application of exciting pulses to the exciting winding 12.

If the current $a$ applied to the input winding 18 is called the input signal, the output pulses $s$ supplied by the output winding 13 at the instants when exciting pulses $e$ are applied to the exciting winding 12 therefore represents, at these instants, the value of the logical function $$S = \overline{A}$$

of the binary variable A, of which the value is 0 or 1, depending upon whether the value of the current $a$ constituting the input signal is zero or equal to the above-defined value of the saturation current.

In accordance with the invention, it is possible to provide electromagnetic logical devices functioning in accordance with the same principle as that of FIGURE 1 and capable of forming output signals representing products and logical sums of theoretically any number of binary variables represented by input signals in the above-indicated manner.

FIGURE 2 illustrates a logical device according to the invention, comprising a magnetic circuit 11 similar to that of the device illustrated in FIGURE 1, an exciting winding 12, an output winding 13 and input windings 18 and 28, extending through the aperture 14 in the control branch 17 of the magnetic circuit 11.

The output pulses $s$ supplied by the output winding 13 at the instant when the exciting pulses $e$ are applied to the exciter winding 12 represent, at these instants, the value of the logical function $$S = \overline{A}.\overline{B}$$

of binary variables A and B represented respectively by input signals $a$, $b$ supplied to the input windings 18 and 28 respectively.

FIGURE 3 illustrates a logical device according to the invention comprising two logical devices 101 and 102 identical to that of FIGURE 2. These devices each comprise a magnetic circuit 111 and 112 respectively, each of which comprises a control branch 171 and 172 respectively each formed with an aperture 141 and 142 respectively. Input windings 181 and 281 extend through the aperture 141, and input windings 182 and 282 extend through the aperture 142. The exciting windings 121 and 122 of these devices are connected in series, and exciting pulses $e$ are applied to the input of the circuit thus formed. The output windings 131 and 132 of these devices are also connected in series, and form the output circuit of the logical device formed by the association of the devices 101 and 102. At the instants when the exciting pulses $e$ are applied, the output circuit thus formed supplies output pulses representing the value assumed at these instants by the logical function $$S = \overline{A}.\overline{B} + \overline{G}.\overline{H}$$

of the binary variables A, B, G and H represented by the signals $a$, $b$, $g$ and $h$, respectively applied to the input windings 181, 281, 182 and 282 respectively.

FIGURE 4 illustrates a device similar to that of FIGURE 3. In this device, the magnetic circuits 111 and 112 have been brought together to form a common trunk portion 27. An exciting winding 12 and an output winding 13 are wound on this common trunk portion 27.

It is obvious that the operation of the device thus formed is similar to that of the device illustrated in FIGURE 3.

FIGURES 5, 6 and 7 show how it is possible to assemble theoretically any number of devices of the type illustrated in FIGURES 1 and 2 to form a device of the type illustrated in FIGURE 4 which is capable of supplying output signals representing a logical sum comprising a number of terms equal to the number of devices thus assembled. In the embodiment illustrated in FIGURES 5, 6 and 7, this number has been made equal to three. Three magnetic circuits 111, 112 and 113, each identical to the magnetic circuits 11 of the devices illustrated in FIGURES 1 and 2, are disposed as shown in FIGURES 5, 6 and 7 so as to form a common trunk portion 27. An exciting winding 12 and an output winding 13 are wound on the said trunk portion 27. Input windings extend through the apertures 141, 142, 143 situated in the control branches or branch portions of the magnetic circuits 111, 112 and 113. FIGURES 5, 6 and 7 show windings 181 and 281 extending through the aperture 141 of the control branch 171 of the magnetic circuit 111, windings 182 and 282 extending through the aperture 142 of the control branch 172 of the magnetic circuit 112, and a winding 183 extending through the aperture 143 of the control branch 173 of the magnetic circuit 113.

The operation of the device thus formed is similar to that of the device illustrated in FIGURE 4. Thus, at the instants when exciting pulses $e$ are applied to the exciting windings 12, the output winding 13 supplies output pulses representing the value taken at these instants by the logical function $$S = \overline{A}.\overline{B} + \overline{G}.\overline{H} + \overline{K}$$

of the binary variables A, B, G, H and K represented by the signals $a$, $b$, $g$, $h$ and $k$ respectively, applied to the input windings 181, 281, 182, 282 and 183 respectively.

Theoretically any number of input windings could be disposed on the control branches of each of the magnetic circuits comprised in a device of the type illustrated in FIGURES 5, 6 and 7, so that it is possible to produce devices of this type which are capable of supplying signals representing any logical functions of the form $$S = \Sigma_i^n = 1 A_i^1 \ldots A_i^2 \ldots A_i^p$$

$n$ and $p$ being any integers.

The following description concerns a particular form of construction of a logical device of the type illustrated in FIGURES 5, 6 and 7. This description, which is given with reference to FIGURES 8 to 17, shows how it is possible in accordance with the invention to provide in a convenient and economic manner devices of this type which are capable of generating output signals representing a logical function of the above-indicated form.

The logical device which will now be described by way of non-limiting example is intended to produce signals representing the logical function $$S = \overline{A}.B + \overline{B}.C$$

of binary variables A, B and C whose direct values are represented by signals $a$, $b$ and $c$ respectively, and whose complementary values are represented by the signals $\bar{a}$, $\bar{b}$ and $\bar{c}$ which are complementary to the signals $a$, $b$ and $c$ respectively.

This device (FIGURES 8 to 10) comprises an assembly of members of the same magnetic substance as the magnetic members of the devices previously described. This assembly of magnetic members comprises a first part 27 (FIGURES 8, 9, 11 and 12) bearing, in the same way as the control branches (17, 171, 172, 173) of the devices previously described, input windings 811, 812, 821, 822, 831, 832. This first part consists of two rectangular plates 271 and 272. Generally speaking, this first part comprises a number of plates which may be termed branch portions, equal to the number of terms of the logical sum which is to be represented by the output signal of the device, each plate corresponding to a different term of the logical sum under consideration and having, as will hereinafter be seen, a particular configuration such that the corresponding term is a product of particular variables.

Referring to FIGURES 13 and 14, it will be seen that each of the plates 271 and 272 is formed with six apertures, some of which are entirely surrounded by magnetic material and constitute holes, i.e. $t11$, $t22$ in the case of the plate 271, and $21t$, $32t$ in the case of the plate 272, while the others terminate on either one of the sides of the plate (side $c1$ or side $c2$ in the case of the plate 271, side $1c$ or side $2c$ in the case of the plate 272) and constitute recesses, i.e. $e12$, $e21$, $e31$ and $e32$ in the case of the plate 271, and $11e$, $12e$, $22e$ and $31e$ in the case of the plate 272. These various apertures are situated in corresponding positions in the two plates, i.e. any one aperture in a plate is aligned with a corresponding aperture in the other plate when the two plates are superimposed as shown in FIGURES 11 and 12. Thus, as may be seen from FIGURE 11, for example, the hole $t11$ in the plate 271 is aligned with the recess $11e$ in the plate 272, the recess $e12$ in the plate 271 with the recess $12e$ in the plate 272, etc. Generally speaking, the number of apertures in each plate is equal to twice the number of different variables of the logical sum which is to be represented by the output signal of the device.

The device comprises for each different variable a separate pair of input windings. Thus, the windings 811 and 812 (FIGURES 11 and 12) correspond to the variable A, the windings 821 and 822 to the variable B, and the windings 831 and 832 to the variable C.

The signals representing a variable are applied to one of the windings of the pair of windings corresponding to this variable and the complementary signals to the said signals are applied to the other one of the windings of the said pair of windings. Thus, the signal $a$ representing the variable A is applied to the winding 811, while the signal $\bar{a}$ complementary to the signal $a$ is applied to the winding 812. Likewise, the signals $b$ and $c$ are applied to the windings 821 and 831 respectively, while the signals $\bar{b}$ and $\bar{c}$, which are complementary to the signals $b$ and $c$, are applied to the windings 822 and 832 respectively.

Each input winding comprises a rectilinear portion extending through one of the apertures in one plate and through the corresponding aperture in the other plate. Thus, the input winding 811 comprises a rectilinear portion 811$n$ extending through the hole $t$11 in the plate 271 and through the recess 11$e$ in the plate 272. Each input winding comprises another portion which is disposed along the edges of the plates in which there open the apertures through which there passes the rectilinear portion of the said winding when the said apertures are recesses. Thus, the input winding 811 comprises a portion 811$v$ which is disposed parallel to the rectilinear portion 811$n$ along the edge of the plate 272 at which the recess 11$e$ in the said plate opens. In this way, a saturation current flowing through a winding which extends through a plate by way of an aperture forming a recess cannot generate in this plate a flux capable of bringing a portion of this plate to the state of magnetic saturation. On the other hand, a saturation current flowing through a winding which extends through a plate by way of a hole generates a magnetic flux in this plate and brings to the state of magnetic saturation a portion of this plate which is situated around the said hole and the position of each hole is such that the plate is separated into two parts by the said portion thus brought to the state of magnetic saturation. For example, when a saturation current flows through the winding 811, of which the rectilinear portion 811$n$ extends through the plate 271 by way of the hole $t$11, that portion I of the plate (FIGURE 11) which is bounded by the edges of the plate and the dash-dotted lines is brought to the state of magnetic saturation. This portion I, as will be seen from FIGURE 11, separates the plate 271 into two parts II and III.

In order to prepare each of the plates forming the first part of the assembly of magnetic members comprised in the device now being described, use may be made of a plate of rectangular shape formed with perforations regularly situated in two columns along a number of lines equal to the number of different variables in the logical sum which is to be represented by the output signal of the device. This is what is shown in FIGURE 15 in the case where this number is equal to three.

The perforations $p$11, $p$12, $p$21, $p$22, $p$31 and $p$32 in such a plate 7 (FIGURE 15) have their respective centres at the points of intersection of two vertical straight lines V1, V2 parallel to the longitudinal axis of the plate, with horizontal straight lines perpendicular to the said axis, i.e. H1, H2 and H3 in the case of three different variables.

In order to prepare the plate 271 (FIGURE 13) corresponding to the arm $\bar{A}.B$ of the logical sum under consideration, therefore, a plate such as the plate 7 illustrated in FIGURE 15 is employed. The perforations $p$12, $p$21, $p$31 and $p$32 in the said plate are converted into recesses $e$12, $e$21, $e$31 and $e$32 by removing the magnetic material situated between each of the said perforations and the nearest edge of the plate. The perforations $p$11 and $p$22 are not modified and constitute the holes $t$11 and $t$21 in the plate 271. In this way, when saturation currents flow through the windings 812, 821, 831 and 832 which extend through the recesses $e$12, $e$21, $e$31 and $e$32 respectively in the plate 271 and to which there are applied, respectively, the signals representing the complement to the variable A, the variable B, the variable C and the complement to the variable C, these saturation currents cannot generate magnetic fluxes capable of bringing portions of the plate 271 to the state of magnetic saturation. On the other hand, when saturation currents flow through the windings 811 and 812 extending through the holes $t$11 and $t$22 respectively and to which are applied, respectively, the signal representing the variable A and the signal representing the complement to the variable B, these saturation currents generate magnetic fluxes capable of bringing to the state of magnetic saturation portions of the plate 271, each of these portions by itself separating the plate into two parts, as has previously been shown with regard to the portion I of the said plate.

In order to prepare the plate 272 (FIGURE 14) corresponding to the term $\bar{B}.C$ of the logical sum under consideration, the perforations $p$11, $p$12, $p$22 and $p$31 in a plate identical to the plate 7 (FIGURE 15) are converted into recesses 11$e$, 12$e$, 22$e$ and 31$e$ and the perforations $p$21 and $p$32 are not modified.

Figure 8:
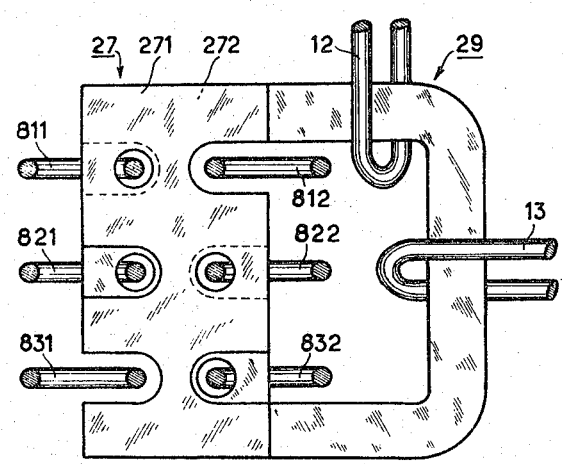
Figure 9:
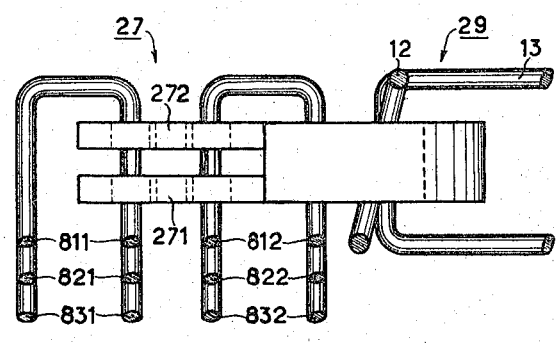
Figure 10:
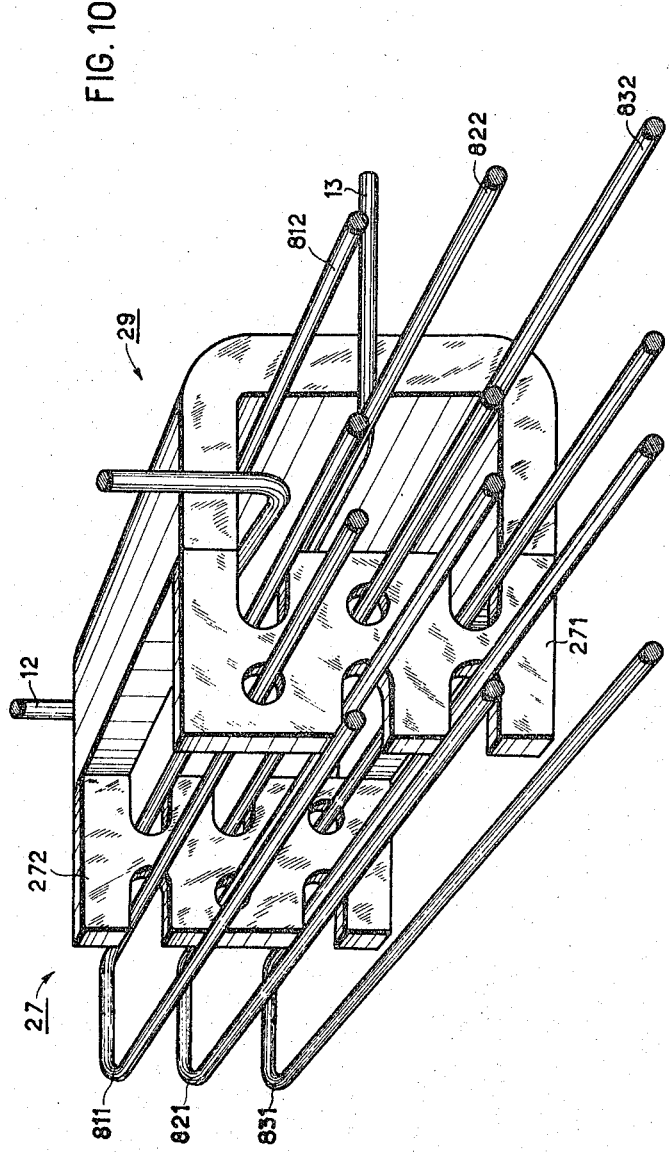

As is shown in FIGURES 8 to 10, the assembly of magnetic parts composing the logical device now being described comprises a second part, or trunk portion, 29 bearing the exciting winding 12 and the output winding 13. This second part has the shape of the letter C. It is so disposed in relation to the first part 27 as to form a closed magnetic circuit with each of the plates constituting this first part and in such manner that a magnetic flux generated by a current passing through the exciting winding 12 passes in series through the various portions of each plate, which are each capable of being brought to the state of magnetic saturation under the previously defined conditions.

If, in this device, an input winding extending through a plate by way of a hole is traversed by a saturation current, the magnetic circuit formed by the plate under consideration and the second part 29 of the assembly behaves as a circuit having an air gap having the dimension of the saturated portion of the plate.

A sufficient condition to enable the output winding 13 of the device to supply a pulse when a pulse is applied to the exciting winding 12 is that no portion of at least one of the various plates forming the first part of the assembly should be brought to the state of magnetic saturation.

If it is considered that the plate 271 comprises two holes $t$11 and $t$22 through which there extend respectively the windings 811 and 822 to which are applied the signals $a$ and $\bar{b}$ respectively, it will be seen that a sufficient condition for the device to supply an output pulse is that neither one of the signals $a$ and $\bar{b}$ should take the value of the saturation current at the instant when a pulse is applied to the exciting winding. This condition is satisfied provided that the variable A takes the value 0 and that the variable B takes the value 1 at this instant. The signal supplied by the device therefore does in fact represent a logical sum whose term is $\bar{A}.B$.

If in addition it is considered that the plate 272 comprises two holes 21$t$ and 32$t$ through which there extend, respectively, the windings 821 and 832 to which are applied the signals $b$ and $\bar{c}$ respectively, it will be seen that the device which has just been described also supplies an output pulse expressing the fact that the condition indicated by the term $\bar{B}C$ of the logical sum under consideration is satisfied when the binary variables B and C take the values 0 and 1 respectively.

Of course, the invention is not limited to the embodiments previously described.

For example, the second part 29 of the assembly of magnetic members may consist of a number of members 291, 292 stacked one upon the other as shown in FIGURE 16.

For example again, as shown in FIGURE 17 in the case of the plate 271, the recesses may have shapes and be disposed in positions other than those indicated in FIGURES 8 to 14.

Finally, it is to be understood that the windings which have been referred to in the foregoing may be formed of a number of turns.

What I claim is:

1. An electromagnetic device for providing a binary output signal representing the value of a logical sum of logical products of binary variables of which both the direct and the complementary value are represented by binary input signals, said device comprising a magnetic structure made up of a C-shaped trunk element and of a number of flat rectangular branch elements of the same dimensions which are stacked with their edges aligned so as to form an I-shaped member which is positioned with its extremities adjacent the extremities of said trunk element, said trunk element and said branch elements being made of a normally unsaturated magnetic material of low magnetic remanence, each branch element corresponding to a different one of the terms of said sum and having apertures therein at the intersection of two longitudinal lateral axis and of a series of parallel transverse axis thereof, said transverse axis being perpendicular to said lateral axis, pairs of apertures disposed on different transverse axis of the branch element corresponding to different ones of the variables which appear in the terms of the sum, and there being on each branch element one pair of apertures corresponding to each distinct one of said variables, one aperture of a pair corresponding to the direct value and the other to the complementary value of the variable to which said pair corresponds, said one aperture or said other aperture of a pair, or both of them, opening on the adjacent edge of the branch element depending on whether the variable to which said pair of apertures corresponds, appears in direct or in complementary value, or does not appear, in the term to which the branch element corresponds, the apertures being identically positioned on the different branch elements so as to register and to form rectilinear parallel passages when the branch elements are stacked with their edges aligned, an exciting winding and an output winding disposed on said C-shaped trunk element, an array of parallel rectilinear input conductors, each threaded through a different one of the passages formed by the registering apertures in the branch elements, there being one conductor threading each of said passages.

References Cited

UNITED STATES PATENTS 2,975,298 3/1961 Fawcett, et al. _____ 307—88
3,059,122 10/1962 Lockhart _____ 307—88

FOREIGN PATENTS 1,351,603 12/1963 France.

TERRELL W. FEARS, *Primary Examiner.*

JAMES W. MOFFITT, *Examiner.*

R. MORGANSTERN, *Assistant Examiner.*